(12) United States Patent
Cili et al.

(10) Patent No.: US 9,872,333 B2
(45) Date of Patent: Jan. 16, 2018

(54) METHOD AND SYSTEM FOR SCHEDULING APPLICATION-GENERATED DATA REQUESTS IN DISCONTINUOUS RECEPTION (DRX) MODE

(71) Applicant: Apple Inc., Cupertino, CA (US)

(72) Inventors: Gencer Cili, Santa Clara, CA (US); Pradeep Suryanath Sharma, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 838 days.

(21) Appl. No.: 13/856,168

(22) Filed: Apr. 3, 2013

(65) Prior Publication Data

US 2014/0301373 A1 Oct. 9, 2014

(51) Int. Cl.
- *H04J 3/00* (2006.01)
- *H04W 76/04* (2009.01)
- *H04L 29/08* (2006.01)
- *H04W 74/00* (2009.01)

(52) U.S. Cl.
CPC ......... *H04W 76/048* (2013.01); *H04L 67/325* (2013.01); *H04W 74/004* (2013.01)

(58) Field of Classification Search
None
See application file for complete search history.

(56) References Cited

U.S. PATENT DOCUMENTS

| 7,920,527 | B2 | 4/2011 | Rakshani et al. |
| 8,199,725 | B2 | 6/2012 | Yu et al. |
| 8,238,837 | B2 | 8/2012 | Womack et al. |
| 8,265,682 | B2 | 9/2012 | Bertrand et al. |
| 2005/0239497 | A1 | 10/2005 | Bahl et al. |
| 2009/0081962 | A1 | 3/2009 | Sohrabi |
| 2009/0168731 | A1 | 7/2009 | Zhang et al. |
| 2011/0026512 | A1 | 2/2011 | Wenham et al. |
| 2011/0268000 | A1* | 11/2011 | Kashikar et al. ............. 370/311 |
| 2012/0158908 | A1* | 6/2012 | Luna ..................... H04W 28/14 709/217 |

(Continued)

FOREIGN PATENT DOCUMENTS

| WO | WO2010147719 | 12/2010 |
| WO | WO2011157235 | 12/2011 |

OTHER PUBLICATIONS

PCT Application No. PCT/US2014/049025—International Search Report and Written Opinion dated Nov. 14, 2014.

*Primary Examiner* — Edan Orgad
*Assistant Examiner* — Rebecca Song
(74) *Attorney, Agent, or Firm* — Downey Brand LLP

(57) ABSTRACT

The invention provides a technique for managing application-generated data requests within a wireless communication device comprising a baseband component operating in discontinuous reception (DRX) mode. The technique includes the steps of receiving a data request from an application, tagging the data request as a low-priority data request or a high-priority data request in accordance with a manner in which the application is executing, forwarding the tagged data request to the baseband component, determining a next-scheduled active time based on parameters associated with the DRX mode, and causing a scheduling request to be issued at or substantially proximate to the next-scheduled active time.

18 Claims, 10 Drawing Sheets

(56) References Cited

U.S. PATENT DOCUMENTS

| | | | |
|---|---|---|---|
| 2012/0207040 A1* | 8/2012 | Comsa | H04W 72/1215 370/252 |
| 2012/0213150 A1 | 8/2012 | Oguz et al. | |
| 2013/0021995 A1* | 1/2013 | Ehsan et al. | 370/329 |
| 2013/0196621 A1 | 8/2013 | Guday et al. | |
| 2013/0258919 A1* | 10/2013 | Damnjanovic | 370/311 |
| 2014/0293848 A1* | 10/2014 | Varney | 370/311 |
| 2015/0117342 A1* | 4/2015 | Loehr et al. | 370/329 |

\* cited by examiner

METHOD AND SYSTEM FOR SCHEDULING APPLICATION-GENERATED DATA REQUESTS IN DISCONTINUOUS RECEPTION (DRX) MODE

TECHNICAL FIELD

The present invention relates generally to wireless computing devices. More particularly, present embodiments of the invention relate to a method and system for scheduling application-generated data requests in discontinuous reception (DRX) mode.

BACKGROUND

Recent hardware and software advancements have enabled wireless computing devices to simultaneously execute a variety of applications. For example, popular mobile device operating systems can be configured to concurrently execute a number of applications such that a user can, for example, quickly access his or her email, check the weather, and check stock prices through simple touch gestures made on a display of his or her wireless computing device. In general, and mainly due to the limited display size of wireless computing devices, mobile operating systems manage a single "foreground" application and many "background" applications. A user, through interaction with his or her wireless computing device, can cause a foreground application to become a background application, and vice-versa. In some cases, background applications—despite not being visible to the user on the display—continue to execute and provide background functionality to the user. For example, a music streaming application can be configured to play music even when the user places the application into a background state. Other examples include an email application and a stock application that are each configured to periodically (e.g., every ten minutes) check for updates even when executing in the background.

Although the foregoing techniques enhance overall user experience, they also provide new challenges with respect to power management within wireless computing devices. In particular, power consumption of a wireless computing device generally scales with the total number of data requests made by background applications. Moreover, when combined with additional power demands associated with new baseband radios being included in wireless computing devices—such as those that are compatible with Long Term Evolution (LTE) networks—significant decreases are seen in the overall uptime that the wireless computing device can provide to the user on a single battery charge. One attempt to mitigate this problem targets the manner in which the radio system accesses LTE networks, and is referred to as "discontinuous reception" (DRX) mode. As is well-known, DRX mode involves reducing the duty cycle of transceivers included in the radio system and increases overall downtime of the radio system, thereby saving power. Unfortunately, however, existing radio systems are configured to immediately respond to any data request generated by an application (either in the foreground or the background), which disrupts and reduces scheduled radio downtime when operating in DRX mode. As a result, the amount of radio downtime that would normally occur in DRX mode is reduced and overall expected power savings is reduced.

SUMMARY

This paper describes various embodiments that relate to a technique that can provide additional power savings when operating in DRX mode. In particular, data requests generated by applications are analyzed and tagged as high-priority or low-priority to indicate to a baseband component how and when the data request should be carried out. In particular, high-priority data requests—such as those generated by an application executing in the foreground, or by an application currently executing in the background but is one that is frequently accessed by a user—are handled according to conventional techniques since, in this scenario, enhanced performance has priority over power savings. Alternatively, low-priority data requests—such as those generated by background applications that are infrequently accessed by the user—are handled according to the new techniques described herein, which involve delaying the data request from being carried out by the baseband until particular points within the DRX mode are reached.

One embodiment of the invention sets forth a computer-implemented method for tagging application-generated data requests within a wireless communication device comprising a baseband component operating in a connected discontinuous reception (C-DRX) mode. The method includes the steps of receiving a data request from an application, tagging the data request as a low-priority data request or a high-priority data request in accordance with a manner in which the application is executing, forwarding the tagged data request to the baseband component, determining that the tagged data request is tagged as a low-priority data request, determining a next-scheduled active time based on parameters associated with the C-DRX mode, identifying a mean value for an amount of time observed between issuance times of scheduling requests and receipt times of corresponding scheduling grants, and causing a scheduling request to be issued at a time equal to the difference between the mean value and the next-scheduled activation time.

Another embodiment of the invention sets a method for managing application-generated data requests within a wireless communication device comprising a baseband component operating in an idle discontinuous reception (I-DRX) mode. The method includes the steps of receiving a data request from an application, tagging the data request as a low-priority data request or a high-priority data request in accordance with a manner in which the application is executing, forwarding the tagged data request to the baseband component, determining that the tagged data request is tagged as a low-priority data request, determining a next-scheduled random access channel (RACH) event time based on parameters associated with the I-DRX mode, and causing a scheduling request to be issued at the next-scheduled RACH event time.

Another embodiment of the invention sets forth a method for tagging application-generated data requests within a wireless communication device comprising a baseband component operating in an idle discontinuous reception (I-DRX) mode. The method includes the steps of receiving a data request from an application, assigning a first value to the data request based on the frequency at which the application is accessed by a user of the wireless communication device, assigning a second value to the data request based on a type of the application, summing the first value and the second value to produce a third value, and tagging the data request as a high-priority data request if the third value is greater than or equal to a pre-defined application-rating threshold value, or tagging the data request as a low-priority data request if the third value is less than the pre-defined application-rating threshold value.

Yet another embodiment of the invention sets forth a wireless communication device that includes a processor, a baseband component configured to operate in a discontinuous reception (DRX) mode, and a memory, wherein the memory stores instructions that, when executed, cause the wireless communication device to implement a method for managing application-generated data requests. The method includes the steps of receiving a data request from an application, tagging the data request as a low-priority data request or a high-priority data request based on the manner in which the application is executing, forwarding the tagged data request to the baseband component, determining that the tagged data request is tagged as a low-priority data request, determining a next-scheduled active time for the baseband component based on parameters associated with the DRX mode, and causing a scheduling request to be issued at or substantially proximate to the next-scheduled active time.

Other embodiments include a non-transitory computer readable medium storing instructions that, when executed by a processor, cause the processor to carry out any of the method steps described above.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements, and in which.

DETAILED DESCRIPTION

Figure 1:
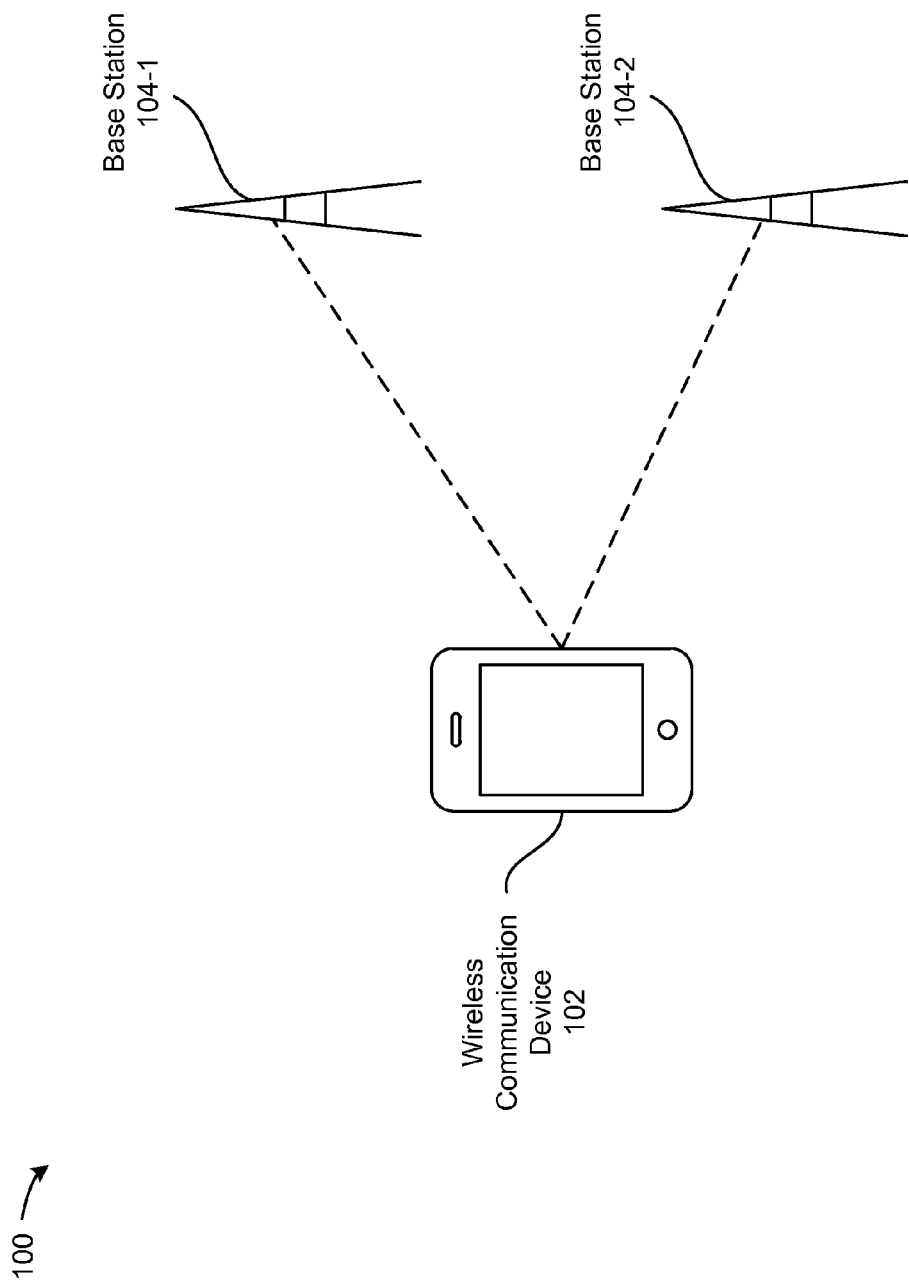
FIG. 1 illustrates a wireless device/server system configured to implement the various embodiments of the invention described herein, according to one embodiment of the invention.

Representative applications of systems, methods, apparatuses, and computer program products according to the present disclosure are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The following sets forth various embodiments directed to techniques that involve modifying the manner in which data requests are carried out when a baseband component of a wireless computing device implements discontinuous reception (DRX) mode. In particular, a baseband component included in the wireless computing device can be configured to operate in continuous DRX mode (referred to herein as C-DRX) or idle DRX mode (referred to herein as I-DRX), which are described in further detail below in conjunction with FIG. 4A and FIG. 5A, respectively. According to conventional approaches, all data requests generated by applications are immediately carried out by the baseband regardless of the current state of DRX mode, which periodically transitions between an active state and an inactive state. As a result, the baseband often receives data requests while in an inactive state and abruptly transitions into an active state to carry out the data request. Notably, these data requests reduce power savings that would normally be realized through scheduled inactivity states that are not disrupted.

Accordingly, embodiments of the invention provide an enhanced approach in which application data requests are analyzed and tagged as low-priority or high-priority. Low-priority tagging indicates to the baseband that the data request should be carried out according to the new techniques described herein, which involve delaying the data request from being carried out until at or around a next-scheduled active state occurs within DRX mode. In this manner, the time spanned when carrying out the data request overlaps a maximized number of scheduled active states, and also overlaps a minimized number of scheduled inactive states, thereby providing an optimized approach that reduces the frequency at which the baseband operates outside of the DRX mode schedule. Alternatively, high-priority tagging indicates to the baseband component that the data request should be carried out immediately, which coincides with the conventional technique of carrying out the data request immediately and regardless of the current state of the DRX mode. Accounting for high-priority data requests ensures that data requests generated by particular applications—such as a foreground application, or background applications frequently accessed by a user—are immediately carried out by the baseband, which can be useful when performance is prioritized over power savings.

FIG. 1 illustrates a system 100 in accordance with some example embodiments. The system 100 can include a wireless communication device 102 (generally referred to as user equipment, UE). The wireless communication device 102 can be a cellular phone, such as a smart phone device, a tablet computing device, a laptop computing device, or other computing device configured to connect to wirelessly obtain network access via one or more base stations, e.g., a base station 104-1 and a base station 104-2, which are configured to implement cellular radio access technology. For example, the base stations 104-1 and 104-2 can implement Long Term Evolution (LTE) or LTE-Advanced radio access technology, Universal Mobile Telecommunications System (UMTS) radio access technology (e.g., Wideband Code Division Multiple Access (WCDMA), Time Division Synchronous Code Division Multiple Access (TD-SCDMA) network, and/or other UMTS), CDMA2000 radio access technology, 1×RTT radio access technology, Global System for Mobile Communications (GSM) radio access technology, and/or other radio access technology. As will be further described below, the wireless communication device 102 can have a connection to the base station 104-1 and can engage in data communication for the base station 104-1 for an application.

Figure 2:
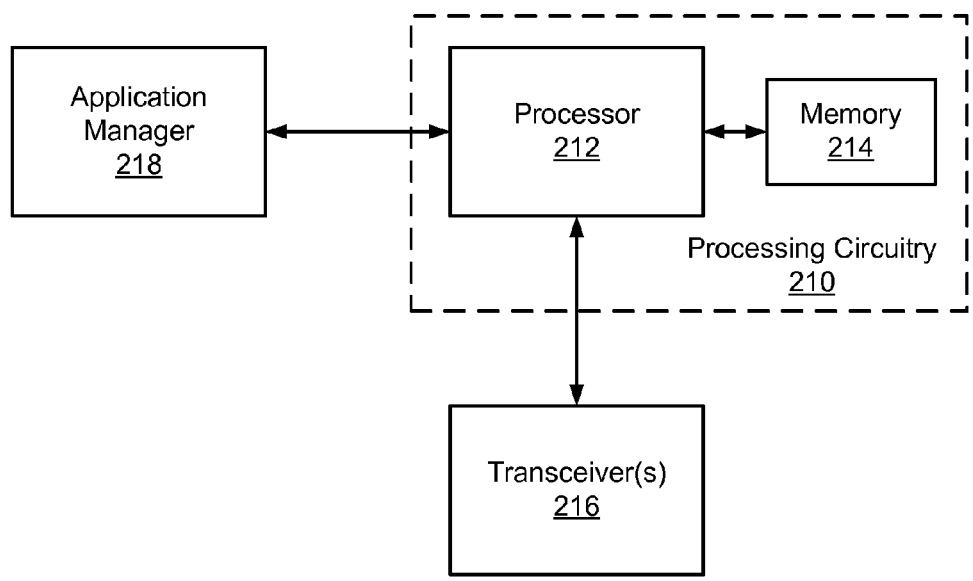
FIG. 2 illustrates a detailed view of the wireless device of FIG. 1, according to one embodiment of the invention.

FIG. 2 illustrates a block diagram of an apparatus 200 that can be implemented on the wireless communication device 102 of FIG. 1 in accordance with some example embodiments. In this regard, when implemented on a computing device, such as wireless communication device 102, apparatus 200 can enable the computing device to operate within the system 100 in accordance with one or more example embodiments. It will be appreciated that the components, devices or elements illustrated in and described with respect to FIG. 2 below may not be mandatory and thus some may be omitted in certain embodiments. Additionally, some embodiments can include further or different components, devices or elements beyond those illustrated in and described with respect to FIG. 2.

In some example embodiments, the apparatus 200 can include processing circuitry 210 that is configurable to perform actions in accordance with one or more example embodiments disclosed herein. In this regard, the processing circuitry 210 can be configured to perform and/or control performance of one or more functionalities of the apparatus 200 in accordance with various example embodiments, and thus can provide means for performing functionalities of the apparatus 200 in accordance with various example embodiments. The processing circuitry 210 can be configured to perform data processing, application execution and/or other processing and management services according to one or more example embodiments.

In some embodiments, the apparatus 200 or a portion(s) or component(s) thereof, such as the processing circuitry 210, can include one or more chipsets, which can each include one or more chips. The processing circuitry 210 and/or one or more further components of the apparatus 200 can therefore, in some instances, be configured to implement an embodiment on a chipset including one or more chips. In some example embodiments in which one or more components of the apparatus 200 are embodied as a chipset, the chipset can be capable of enabling a computing device to operate in the system 100 when implemented on or otherwise operably coupled to the computing device. Thus, for example, one or more components of the apparatus 200 can provide a chipset configured to enable a computing device to operate on a cellular network.

In some example embodiments, the processing circuitry 210 can include a processor 212 and, in some embodiments, such as that illustrated in FIG. 2, can further include memory 214. The processing circuitry 210 can be in communication with or otherwise control the transceiver(s) 216, and/or the application manager 218. The processor 212 can be embodied in a variety of forms. For example, the processor 212 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 can comprise a plurality of processors. The plurality of processors can be in operative communication with each other and can be collectively configured to perform one or more functionalities of the apparatus 200 as described herein. In some example embodiments, the processor 212 can be configured to execute instructions that can be stored in the memory 214 or that can be otherwise accessible to the processor 212. In this manner, whether configured by hardware or by a combination of hardware and software, the processor 212 can provide hardware capable of performing operations according to various embodiments while configured accordingly.

In some example embodiments, the memory 214 can include one or more memory devices. Memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions and/or the like for enabling the apparatus 200 to carry out various functions in accordance with one or more example embodiments. In some embodiments, the memory 214 can be in communication with one or more of the processor 212, transceiver(s) 216, or application manager 218 via a bus(es) for passing information among components of the apparatus 200.

The apparatus 200 can further include transceiver(s) 216. The transceiver(s) 216 can enable the apparatus 200 to send wireless signals to and receive signals from one or more wireless networks using two or more base stations, such as the base station 104-1 and the base station 104-2. In this manner, the transceiver(s) 216 can be configured to support any type of radio access technology that may be implemented by the base station 104-1 and the base station 104-2. In some example embodiments, the transceiver(s) 216 can include a single transceiver configured to enable the wireless communication device 102 to establish connections to both the base station 104-1 and the base station 104-2. Alternatively, in some example embodiments, the transceiver(s) 216 can include a first transceiver configured to enable the wireless communication device 102 to connect to the base station 104-1 and a second transceiver configured to enable the wireless communication device 102 to connect to the base station 104-2.

The apparatus 200 can further include application manager 218. The application manager 218 can be embodied as various means, such as circuitry, hardware, a computer program product comprising computer readable program instructions stored on a computer readable medium (for example, the memory 214) and executed by a processing device (for example, the processor 212), or some combination thereof. In some embodiments, the processor 212 (or the processing circuitry 210) can include, or otherwise control the application manager 218. As described in greater detail below in conjunction with FIGS. 3A-3B, the application manager 218 is configured to manage data requests issued by applications executing on the wireless communication device 102, such as user applications that execute via an operating system of the wireless communication device 102 (not illustrated). In particular, the application manager 218 is configured to tag data requests as high-priority data requests or low-priority data request based on a variety of factors and conditions, as set forth in greater detail below and in conjunction with FIGS. 3A-3B.

Figure 3A:
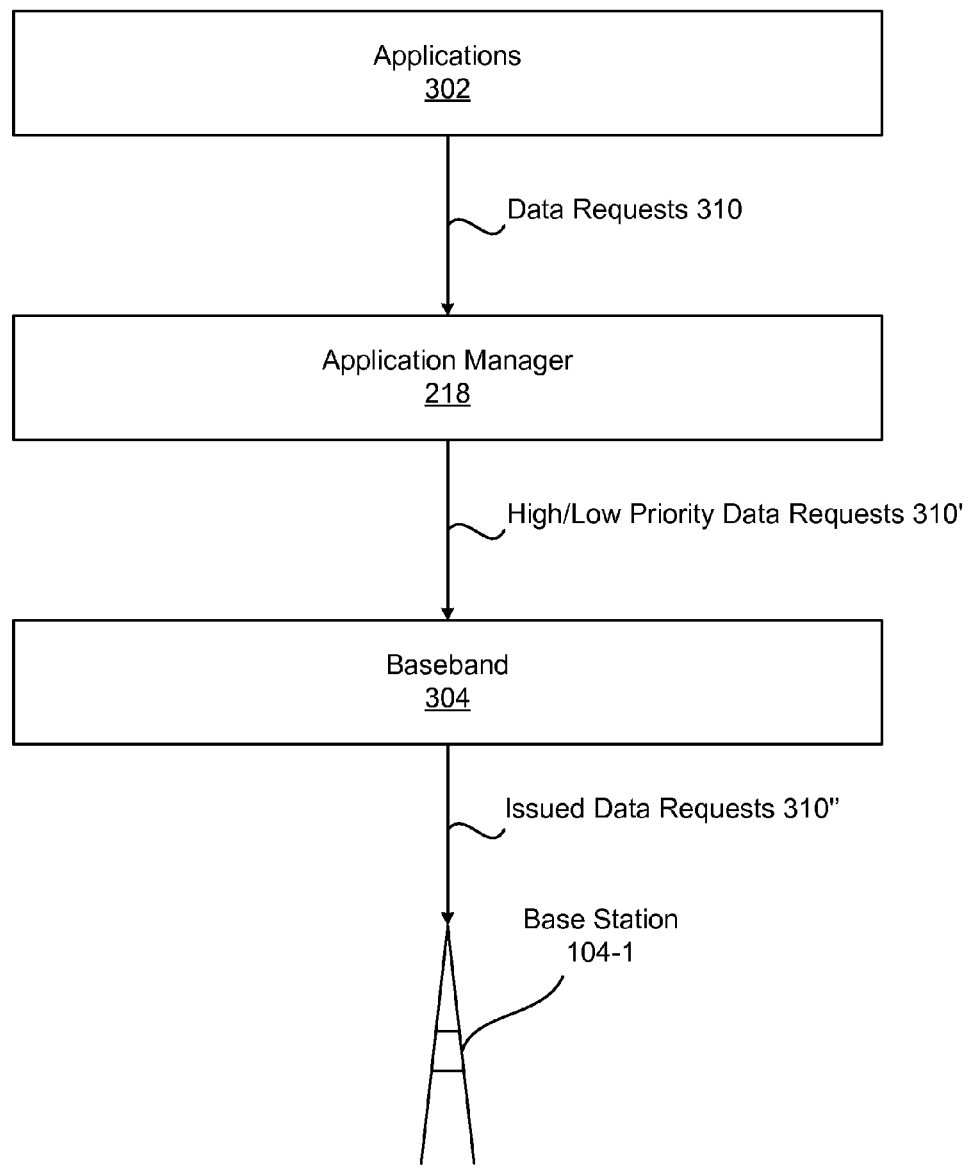
FIG. 3A illustrates a system layer diagram that can be implemented on the wireless device of FIG. 1, according to one embodiment of the invention.

FIG. 3A illustrates a system layer diagram 300 that can be implemented on the wireless communication device 102 in accordance with some example embodiments. As illustrated in the system layer diagram 300, the system can include applications 302, which can include any application that can be implemented on the wireless communication device 102, and for which data can be sent and/or received over a network connection. By way of non-limiting example, an application that can be implemented on the application layer can include an email application, web browsing application, media player, a game, and/or other application for which data can be sent and/or received over a network connection for supporting operation of the application.

The system layer diagram 300 can further include a baseband 304. The baseband 304 can include software, firmware, hardware, or some combination thereof that can be configured to control operation of one or more network interfaces, such as the transceiver(s) 216, which can be implemented on the wireless communication device 102. In this regard, the baseband 304 can be configured to perform operations to establish network connections and manage data transfer over a network interface. As previously set forth herein, the baseband 304 can be configured to operate either in continuous DRX mode (C-DRX) or idle DRX (I-DRX) mode.

As shown in FIG. 3A, the application manager 218 can be configured to interface between the applications 302 and the baseband 304 such that data requests (illustrated as data requests 310) generated by the applications 302 are analyzed and tagged as high-priority or low-priority by the application manager 218. In turn, and as described in greater detail below in conjunction with FIGS. 4B-4C and FIGS. 5B-5C, the baseband 304 receives the tagged data requests and manages transmission of the data requests in view of the DRX mode (i.e., C-DRX or I-DRX) in which the baseband 304 is operating.

Figure 3B:
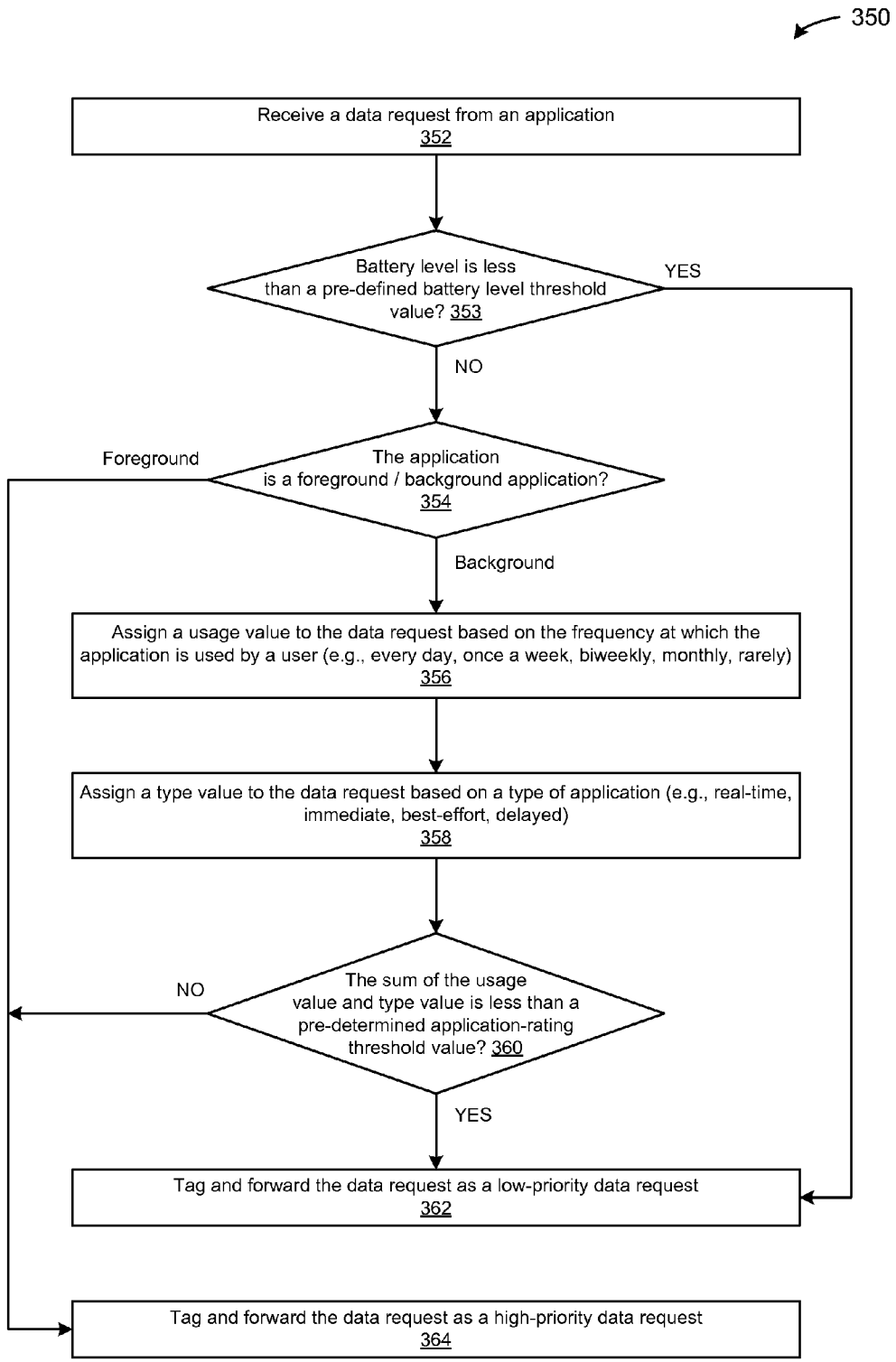
FIG. 3B illustrates a flow diagram for tagging a data request (as high-priority or low-priority) issued by an application, according to one embodiment of the present invention.

FIG. 3B sets forth a flow diagram of method steps 350 for tagging a data request issued by an application, according to one embodiment of the present invention. Although the method steps are described in conjunction with the systems described herein, persons skilled in the art will understand that any system configured to perform the method steps, in any order, is within the scope of the invention.

As shown, the method 350 begins at step 352, where the application manager 218 receives a data request from an application. At step 353, the application manager 218 determines whether a battery level of the wireless communication device 102 is less than a pre-defined battery level threshold value. If, at step 353, the application manager 218 determines that the battery level of the wireless communication device 102 is less than the pre-defined battery level threshold value, then the method 350 proceeds to step 362, where the application manager 218 tags and forwards the data request as a low-priority data request. In particular, the application manager 218 tags the data request as a low-priority data request since, in view of the low battery, any potential power savings opportunities should be pursued. Alternatively, if, at step 353, the application manager 218 determines that the battery level of the wireless communication device 102 is not less than the pre-defined battery level threshold value, then the method 350 proceeds to step 354.

At step 354, application manager 218 determines whether the application is a foreground application or a background application. If, at step 354, application manager 218 determines that the application is a foreground application, then the method 350 proceeds to step 364, where the application manager 218 tags the data request as a high-priority data request and then forwards the data request to the baseband 304 for handling, since foreground applications 302 imply that the user is seeking an immediate response. Otherwise, the method 350 proceeds to step 356.

At step 356, the application manager 218 assigns a usage value to the data request based on the frequency at which the application is used by a user (e.g., every day, once a week, biweekly, monthly, rarely). For example, according to one tagging scheme, the application manager 218 assigns a value of "10" if the application is used every day, a value of "5" if the application is used once a week, and so forth, such that a larger usage value implies heavier usage of the application. Similarly, at step 358, application manager 218 assigns a type value to the data request based on a type of application (e.g., real-time, immediate, best-effort, delayed). For example, according to one tagging scheme, the application manager 218 assigns a value "10" to the data request if it is determined that the application is real-time (e.g., a video chat application), a value "5" if it is determined that the application is "immediate" (e.g., a text-messaging application), a value "2.5" if it is determined that the application is "best-effort" (e.g., a music streaming application), and a value of "0" if it is determined that the application is "delayed" (e.g., a weather application).

At step 360, application manager 218 determines whether the sum of the usage value and type value is less than a pre-defined application-rating threshold value, which can be set according to the type of wireless communication device 102, the preferences of the user, and the like. If, at step 360, application manager 218 determines that the sum of the usage value and type value is less than a pre-defined application-rating threshold value, then the method 350 proceeds to step 362, where application manager 218 tags and forwards the data request as a low-priority data request, which is handled according to the new techniques described below in conjunction with FIGS. 4B-4C and 5B-5C. Otherwise, the method 350 proceeds to step 364, where the application manager 218 tags and forwards the data request as a high-priority data request.

Figure 4A:
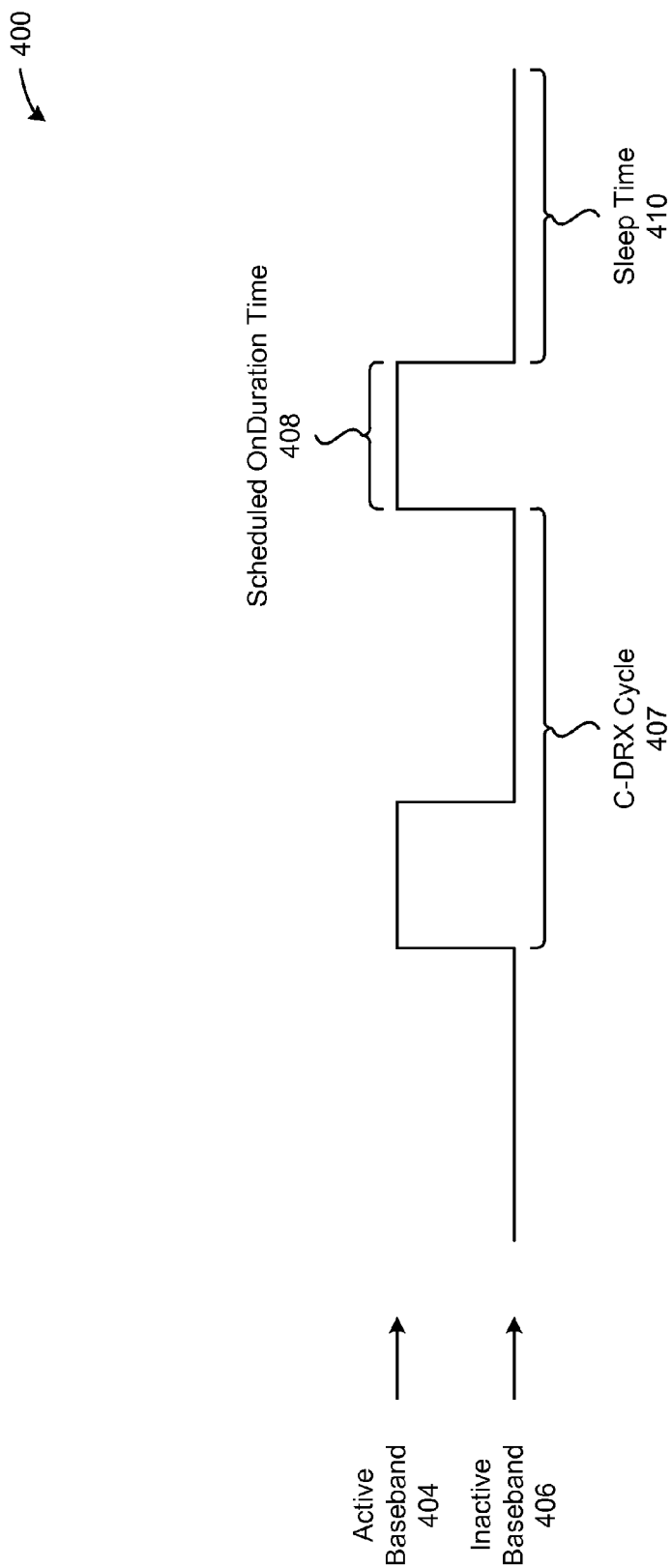
FIG. 4A provides a conceptual illustration of C-DRX mode operation, according to one embodiment of the present invention.

FIG. 4A provides a conceptual illustration 400 of the wireless communication device 102 operating in C-DRX mode, according to one embodiment of the present invention. As illustrated in FIG. 4A, the baseband 304, when in C-DRX mode by has scheduled downtime (i.e., inactivity) and uptime (i.e., activity) states, which are illustrated as active baseband 404 and inactive baseband 406. In particular, the baseband 304 transitions between an active and an inactive state according to a C-DRX cycle 407, which is defined by two parameters: the amount of uptime per C-DRX cycle 407, which is illustrated as the scheduled OnDuration time 408, and the amount of downtime per C-DRX cycle 407, which is illustrated as sleep time 410. The C-DRX cycles 407 enable the wireless communication device 102 to conserve energy since the wireless communication device 102 is configured to receive data transmissions from, for example, the base station 104-1, only periodically when OnDuration times 408 occur. In particular, the wireless communication device 102, when registering with the base station 104, transmits information about the C-DRX cycle 407 to the base station 104-1 such that the base station 104-1 is aware of the time slots where the wireless communication device 102 is capable of receiving data. In this manner, the wireless communication device 102 is able conserve energy since the baseband 304 is not required to be continually active and listening for data transmissions.

Figure 4B:
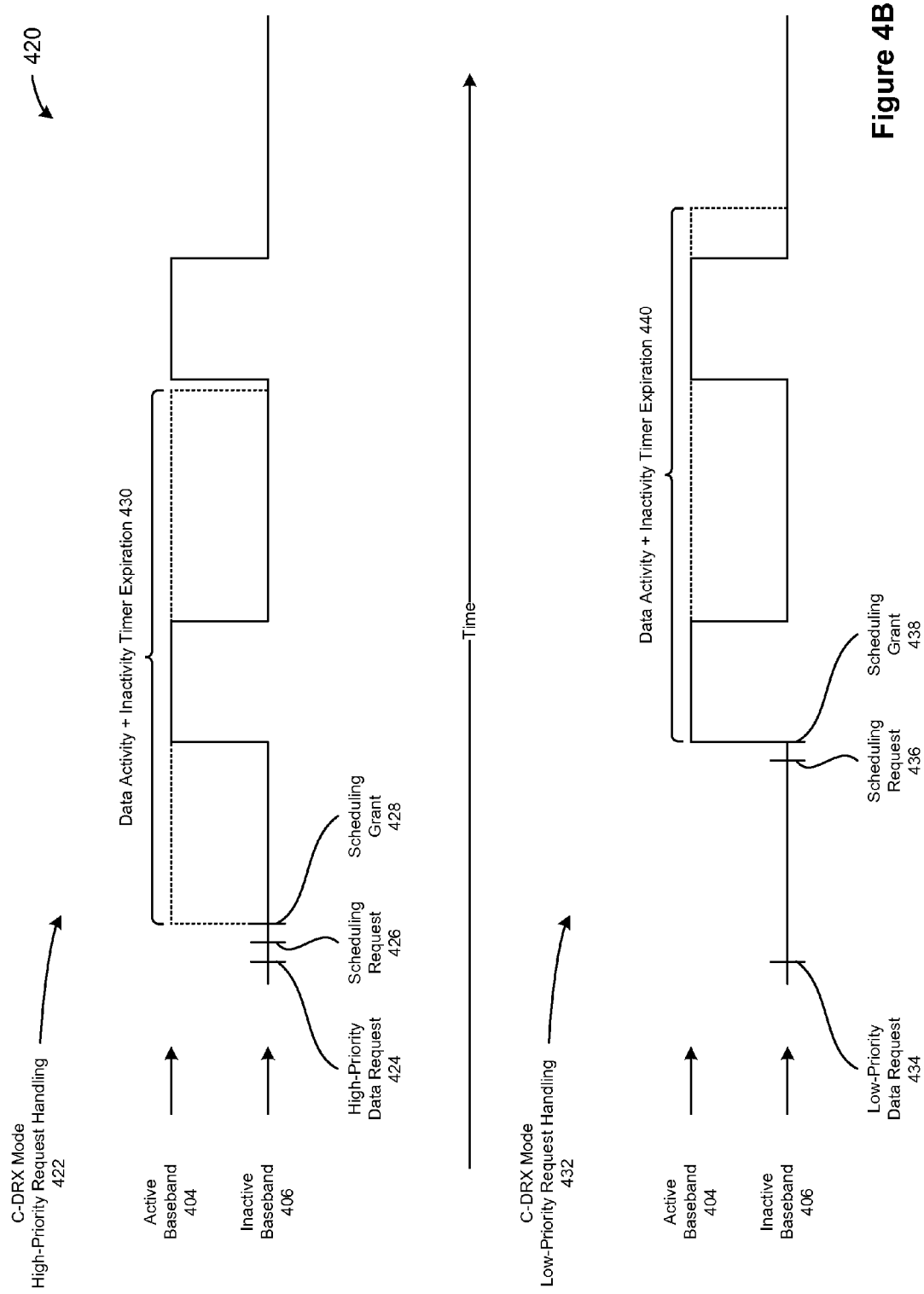
FIG. 4B provides a conceptual illustration of the wireless device of FIG. 1 carrying out high-priority data requests and low-priority data requests when operating in C-DRX mode, according to one embodiment of the present invention.

FIG. 4B provides a conceptual illustration 420 of the baseband 304 handling high-priority data requests and low-priority data requests when operating in C-DRX mode. In particular, FIG. 4B illustrates C-DRX mode high-priority request handling 422, which illustrates a sequence of events that are carried out by the baseband 304 when a high-priority data request is received from the application manager 218. As shown in FIG. 4B, a high-priority data request 424 is received at a first instance of time, e.g., after the application manager 218 tags the data request as a high-priority data request and forwards the high-priority data request to the baseband 304 for handling. In response, and because the data request is tagged as a high-priority data request, the baseband 304 issues to the base station 104-1 a scheduling request 426 at a second instance of time immediately after the first instance of time. In particular, the scheduling request 426 is issued by the baseband 304 in order to indicate to the base station 104-1 that the baseband 304 wishes to carry out the received data request prior to the next-scheduled OnDuration time (referred to herein as t.OnDuration). At a third instance of time, the baseband 304 receives from the base station 104-1 a corresponding scheduling grant that indicates to the baseband 304 that the baseband 304 is permitted to carry out the data request. In some cases, the scheduling grant includes an inactivity timer expiration value that is set by the base station 104-1 and forces the baseband 304 to remain in an active state for a particular amount of time even after the data request is carried out. For example, if the data request takes 10 milliseconds to carry out after the scheduling grant 428 is received, and the inactivity timer expiration is 80 milliseconds, then the "Data Activity+Inactivity Timer Expiration 430" illustrated in FIG. 4B represents a span of time that is (10 milliseconds+80 milliseconds)=90 milliseconds in length.

Notably, the high-priority C-DRX example illustrated in FIG. 4B highlights inefficiencies that occur with respect to power savings when the high-priority data request 424 is immediately carried out by the baseband 304 regardless of whether the baseband 304 is in an active or an inactive state through the C-DRX cycles 407. For example, only a single scheduled OnDuration time—which is a scheduled amount of time that the baseband 304 would spend in an active state regardless of data transmission activity—overlaps the amount of time consumed by the "Data Activity+Inactivity Timer Expiration 430" time span. As a result, a significant amount of sleep time 410—which is a scheduled amount of time that the baseband 304 would spend in an inactive state if no data transmission activity were being carried out—is consumed since the wireless communication device 102 remains in an active state and overlaps scheduled sleep times 410 while carrying out the data request and/or waiting in an active state until the inactivity timer expiration. Although this approach is not ideal with respect to power savings, it nonetheless remains intact for high-priority data requests to accommodate scenarios where immediate handling of data requests is desired by the user, e.g., when the wireless communication device 102 is plugged-in and performance has a higher priority than overall power savings.

FIG. 4B also illustrates C-DRX mode low-priority request handling 432, which illustrates a sequence of events that are carried out by the baseband 304 when a low-priority data request is received from the application manager 218, as shown in FIG. 4B. In the example illustrated in FIG. 4B, a low-priority data request 434 is received at a first instance of time. However, unlike the technique described above associated with handling high-priority data requests in C-DRX mode, the baseband 304 does not immediately issue a scheduling request since doing so would cause the baseband 304 to transition into an active state prior to the next-scheduled t.OnDuration and to consume additional power. Instead, the baseband 304 holds the scheduling request and identifies the next-scheduled t.OnDuration so that appropriate preparation can be taken to ensure that the data request is ready to be carried out (i.e., a scheduling grant is received) at or around (i.e., substantially proximate to) the next-scheduled t.OnDuration. More specifically, the baseband 304 is configured to either calculate (or lookup a previous calculation of) the mean value for the amount of time observed (referred to herein as ΔSchedulingGrant) between scheduling requests and corresponding scheduling grants made at previous times with the base station 104-1. In some embodiments, the mean value is reset when a new base station is accessed by the baseband 304 since the new base station may have substantially different response times those observed with respect to previous base station. In this way, the baseband 304 is able to approximate a time at which issuing a scheduling request for carrying out the data request will cause a scheduling grant to be received at or around the next-scheduled t.OnDuration. This notion is illustrated in FIG. 4B, where the scheduling request 436 is issued at a second instance of time that is not immediately after to the first instance of time at which the low-priority data request 434 is received by the baseband 304. Instead, the scheduling request 436 is issued at the time ((next-scheduled t.OnDuration)−ΔSchedulingGrant) such that the scheduling grant 438 is received at or around the time at which the next-scheduled t.OnDuration occurs.

Notably, the low-priority C-DRX example illustrated in FIG. 4B highlights the power savings that can be realized when compared to the high-priority C-DRX example illustrated in FIG. 4B. For example, although the "Data Activity+Inactivity Timer Expiration 440" length of time is equivalent to the "Data Activity+Inactivity Timer Expiration 430", two scheduled OnDuration times 408 are utilized by the low-priority data request 434 versus only a single OnDuration time 408 that is utilized by the high-priority data request 424, thereby contributing to overall power savings. Moreover, the overall amount of sleep time 410 consumed by carrying out the low-priority data request 424 is less than the sleep time 410 consumed by carrying out the high-priority data request 434, thereby further contributing to overall power savings.

Figure 4C:
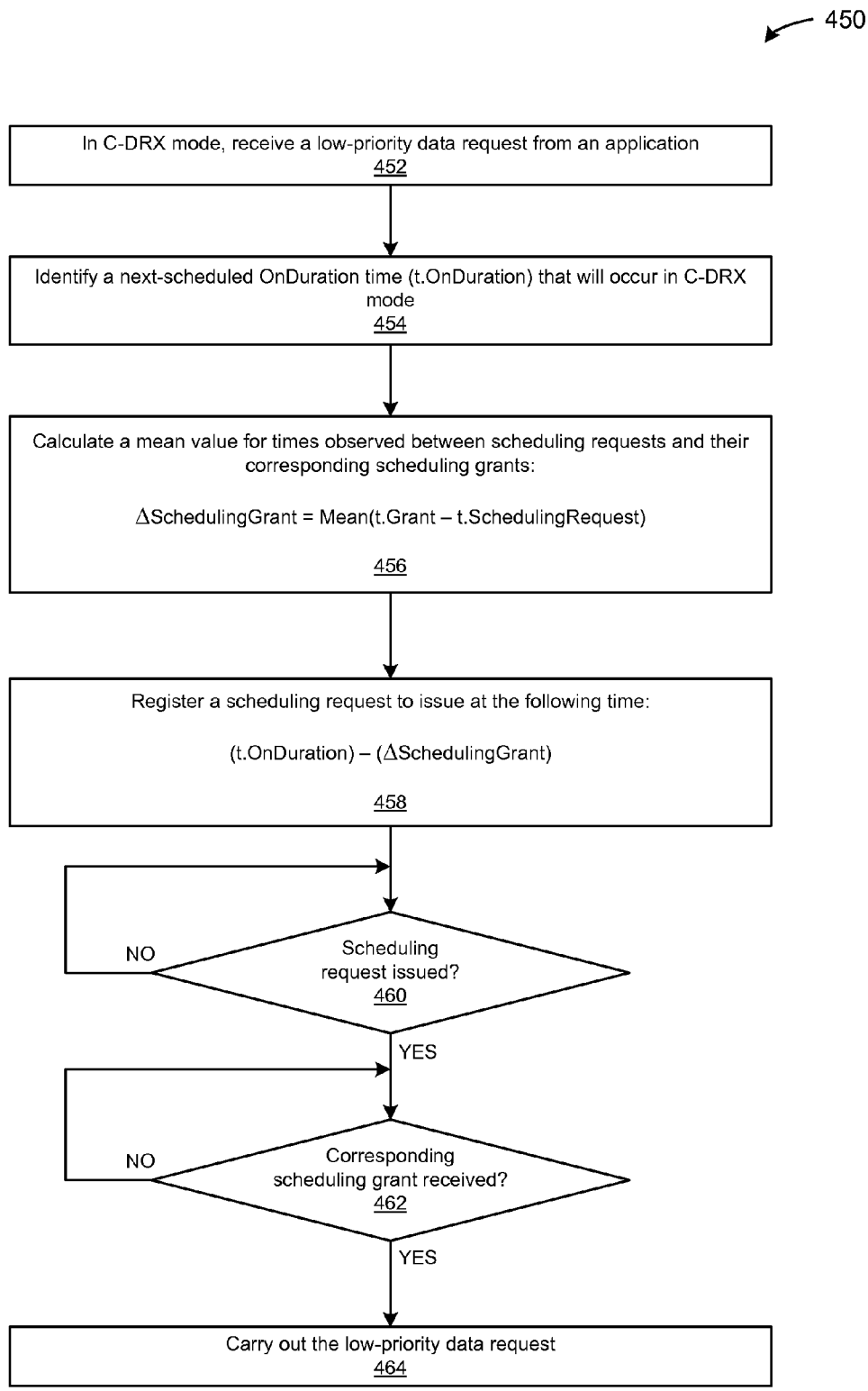
FIG. 4C sets forth a flow diagram of method steps 450 for carrying out a low-priority data request when operating in C-DRX mode, according to one embodiment of the present invention, FIG. 5A provides a conceptual illustration of I-DRX mode operation, according to one embodiment of the present invention.

FIG. 4C sets forth a flow diagram of method steps 450 for carrying out a low-priority data request when operating in C-DRX mode, according to one embodiment of the present invention. Although the method steps are described in conjunction with the systems described herein, persons skilled in the art will understand that any system configured to perform the method steps, in any order, is within the scope of the invention.

As shown in FIG. 4B, the method 450 begins at step 452, where the baseband 304, while operating in C-DRX mode, receives a low-priority data request from an application. At step 454, the baseband 304 identifies a next-scheduled OnDuration time (t.OnDuration) that will occur in C-DRX mode. At step 456, the baseband 304 calculates a mean value for times observed between scheduling requests and their corresponding scheduling grants (ΔSchedulingGrant=Mean (t.Grant−t.SchedulingRequest)). At step 458, the baseband 304 registers a scheduling request to issue at the time (t.OnDuration)−(ΔSchedulingGrant).

At step 460, the baseband 304 determines whether the scheduling request issued. If, at step 460, the baseband 304 determines that scheduling request issued, then the method 450 proceeds to step 462. Otherwise, the method 450 proceeds back to step 460 and continues repeating until the scheduling request is issued. At step 462, the baseband 304 determines whether corresponding scheduling grant is received. If, at step 462, the baseband 304 determines that corresponding scheduling grant received, then the method 450 proceeds to step 464. Otherwise, the method 450 proceeds back to step 462 and continues repeating until the scheduling grant is received. At step 464, the baseband 304 carries out the low-priority data request.

Figure 5A:
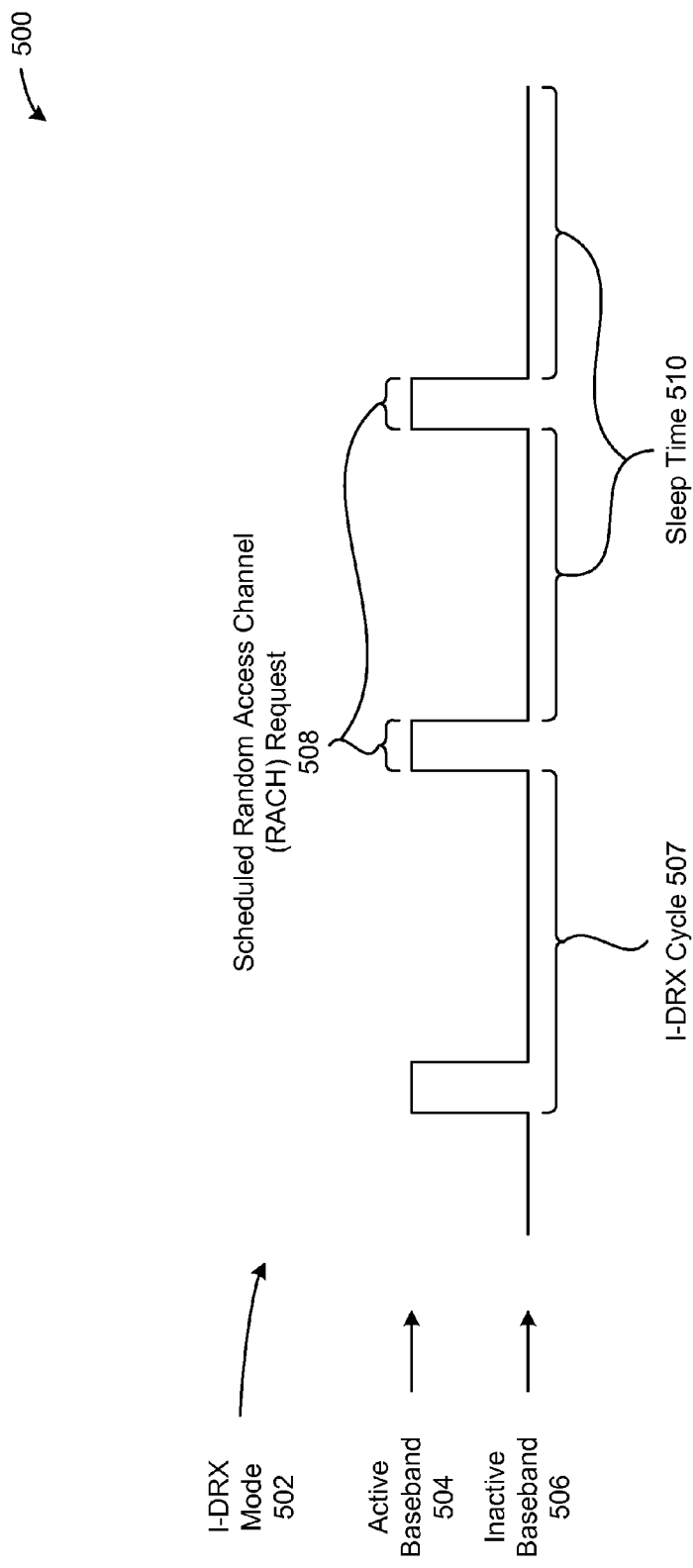
FIG. 5B provides a conceptual illustration of the wireless device of FIG. 1 carrying out high-priority data requests and low-priority data requests when operating in I-DRX mode, according to one embodiment of the present invention.
FIG. 5C sets forth a flow diagram of method steps for carrying out a low-priority data request when operating in I-DRX mode, according to one embodiment of the present invention.

As previously described herein, the baseband 304 can, as an alternative to implementing C-DRX mode, implement I-DRX mode. Accordingly, FIG. 5A provides a conceptual illustration 500 of the wireless communication device 102 operating in I-DRX mode 502, according to one embodiment of the present invention. As illustrated in FIG. 5A, the baseband 304, when in I-DRX mode 502, has scheduled downtime (i.e., inactivity) and uptime (i.e., activity) states, which are illustrated by active baseband 504 and inactive baseband 506. In particular, the baseband 304 transitions between an active and an inactive state according to an I-DRX cycle 507, which is defined by two parameters: the amount of uptime per cycle, which is illustrated as the scheduled random access channel (RACH) request 508, and the amount of downtime per cycle, which is illustrated as sleep time 510. Notably, the amount of downtime per cycle parameter for I-DRX mode 502 is generally longer than the amount of downtime per cycle parameter for C-DRX mode. Like the C-DRX cycles 407, the I-DRX cycles 507 enable the wireless communication device 102 to conserve energy since the baseband 304 is not required to be continually active and listening for data transmissions.

Figure 5B:
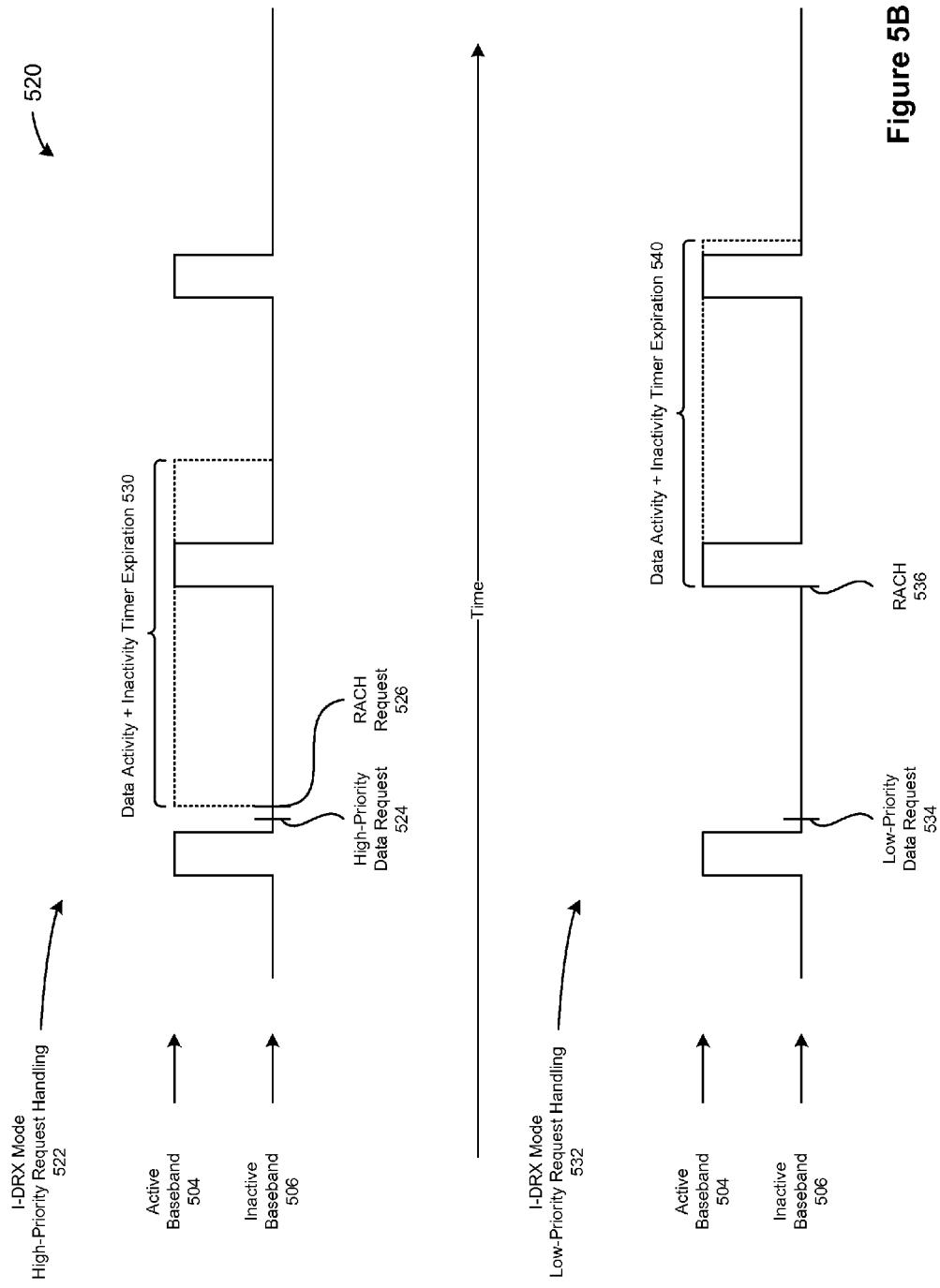

FIG. 5B provides a conceptual illustration 520 of the baseband 304 handling high-priority data requests and low-priority data requests when operating in I-DRX mode. In particular, FIG. 5B illustrates I-DRX mode high-priority request handling 522, which depicts a sequence of events that are carried out by the baseband 304 when a high-priority data request is received from the application manager 218. As shown in FIG. 5B, a high-priority data request 524 is received at a first instance of time, e.g., after the application manager 218 tags the data request as a high-priority data request and forwards the high-priority data request to the baseband 304 for handling. In response, and because the data request is tagged as a high-priority data request, the baseband 304 issues to the base station 104-1 a RACH request 526 at a second instance of time immediately after the first instance of time, whereupon the high-priority data request 524 is carried out.

Notably, the high-priority I-DRX example illustrated in FIG. 5B highlights inefficiencies that occur with respect to power savings when the high-priority data request 524 is immediately carried out by the baseband 304 regardless of whether the baseband 304 is in an active or an inactive state. For example, the RACH request 526 is issued immediately after the high-priority data request 524 is received even though the next-scheduled RACH is not proximate to the high-priority data request 524. As a result, the "Data Activity+Inactivity Timer Expiration 530" time span consumes a significant amount of sleep time 510, which is a scheduled amount of time that the baseband 304 would spend in an inactive state if no data transmission activity were being carried out. As with C-DRX mode, although handling high-priority data requests in I-DRX mode is not ideal with respect to power savings, it nonetheless remains intact since for high-priority data requests to accommodate scenarios where immediate handling of data requests is desired by the user, e.g., when the wireless communication device 102 is plugged-in and performance has a higher priority than overall power savings.

FIG. 5B also illustrates I-DRX mode low-priority request handling 532, which depicts a sequence of events that are carried out by the baseband 304 when a low-priority data request is received from the application manager 218. In the example illustrated in FIG. 4B, a low-priority data request 434 is received at a first instance of time. However, unlike the technique described above associated with handling high-priority data requests in I-DRX mode, the baseband 304 does not immediately issue a RACH since doing so would cause the baseband 304 to transition into an active state prior to the next-scheduled RACH and to consume additional power. Instead, the baseband 304 holds the scheduling request and identifies the next-scheduled RACH so that the low-priority data request 534 can be delayed until a second instance of time: the time at which the next-scheduled RACH occurs.

Notably, the low-priority C-DRX example illustrated in FIG. 5B highlights the power savings that can be realized when compared to the high-priority I-DRX example illustrated in FIG. 5B. For example, two scheduled RACH times 508 are utilized by the low-priority data request 534 versus only a single RACH time 508 that is utilized by the high-priority data request 524, thereby contributing to overall power savings. Moreover, the overall amount of sleep time 510 consumed by the low-priority data request 524 is less than the sleep time 510 consumed by the high-priority data request 534, thereby further contributing to overall power savings.

Figure 5C:
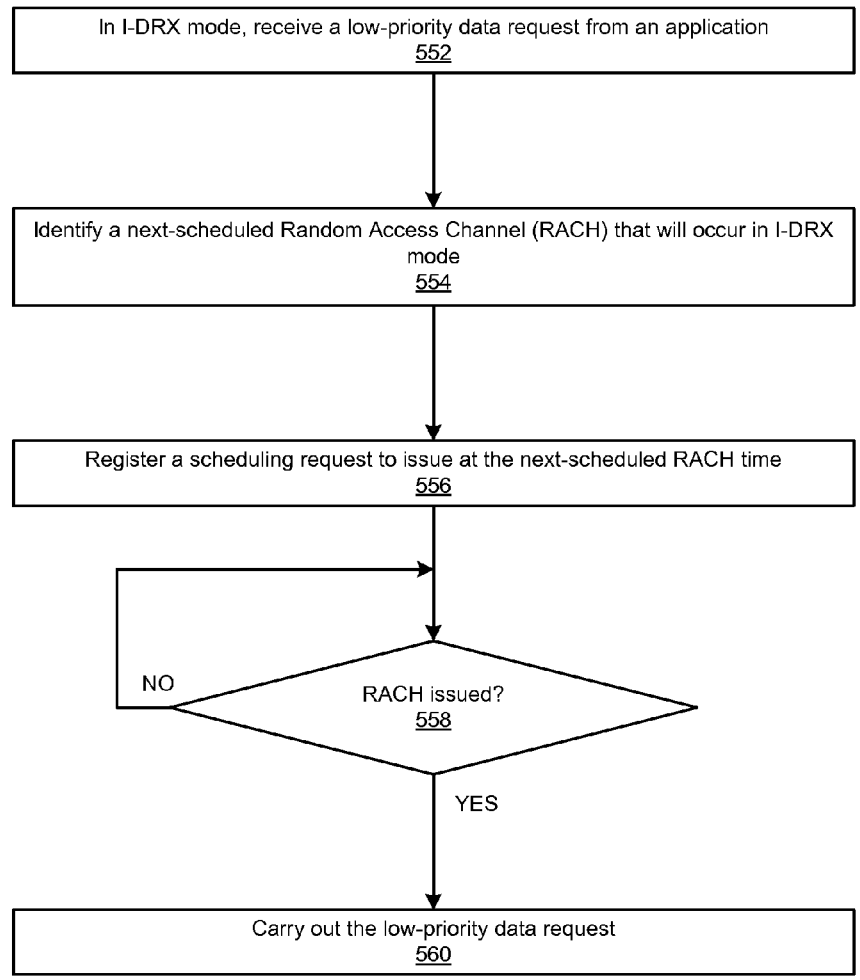

FIG. 5C sets forth a flow diagram of method steps 450 for carrying out a low-priority data request when operating in I-DRX mode, according to one embodiment of the present invention. Although the method steps are described in conjunction with the systems described herein, persons skilled in the art will understand that any system configured to perform the method steps, in any order, is within the scope of the invention.

As shown in FIG. 5C, the method 550 begins at step 552, where the baseband 304 receives a low-priority data request from an application. At step 554, the baseband 304 identifies a next-scheduled Random Access Channel (RACH) event that will occur during I-DRX mode. At step 556, the baseband 304 registers a scheduling request to issue at the next-scheduled RACH time.

At step 558, the baseband 304 determines whether the RACH issued. If, at step 558, the baseband 304 determines that the RACH issued, then the method 550 proceeds to step 560. Otherwise, the method 550 proceeds back to step 558 and the step 558 is repeated until the RACH is issued. At step 560, the baseband 304 issues the low-priority data request.

One advantage provided by the embodiments of the invention is that data requests are withheld from being carried out until scheduled activity times are reached within the DRX mode that is being used—such as scheduled OnDuration times within C-DRX cycles, and RACH times within I-DRX cycles. In this manner, the time spanned when carrying out the data request overlaps an increased amount of scheduled activity times that would have occurred regardless of whether or not a data request needed to be carried out. Moreover, the time spanned when carrying out the data request overlaps a decreased amount of idle time, thereby providing an increase in the overall amount of time that the baseband can remain in idle mode. Another advantage provided by the embodiments of the invention is that, when operating in C-DRX mode, the baseband maintains the mean value for the amount of time observed (ΔSchedulingGrant) between scheduling requests and corresponding scheduling grants made at previous times. This ΔSchedulingGrant value is used by the baseband to preempt an appropriate time at which a scheduling request should be sent out prior to the next-schedule OnDuration time so that a corresponding scheduling grant is received at or around the next-schedule OnDuration time. In this manner, no scheduled activity time is consumed waiting for the scheduling grant that would otherwise occur if the scheduling request were sent out at the onset of the next-scheduled OnDuration time.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

We claim:

1. A computer-implemented method for managing application-generated data requests within a wireless communication device comprising a baseband component operating in a discontinuous reception (DRX) mode, the method comprising:
receiving a data request from an application;
tagging the data request as a low-priority data request or a high-priority data request based on a frequency at which the application is used, wherein the data request is tagged as a high-priority data request when the application is executing as a foreground application and also when the application is executing as a background application that is frequently accessed by a user of the wireless communication device;
forwarding the tagged data request to the baseband component;
determining whether the tagged data request is tagged as a low-priority data request;
determining a next-scheduled active time for the baseband component based on parameters associated with the DRX mode;
causing a scheduling request to be issued immediately, when the tagged data request is tagged as a high-priority data request;
and
causing the scheduling request to be issued for the next-scheduled active time, when the tagged data request is tagged as a low-priority data request.

2. The method of claim 1, further comprising:
receiving, in response to the issued scheduling request, a corresponding scheduling grant; and
carrying out the data request via the scheduling grant.

3. The method of claim 2, wherein the scheduling request is sent before the next-scheduled active time and a corresponding access grant is received during the next-scheduled active time.

4. The method of claim 1, wherein the data request is tagged as a low-priority data request when the application is executing as a background application and the data request is tagged as a high-priority data request when the application is executing as a foreground application and wherein, when a battery level of the wireless communication device is less than a pre-defined battery level threshold value, the data request is tagged as a low-priority data request even if the application is executing as a foreground application.

5. The method of claim 1, wherein the DRX mode is a continuous discontinuous reception (C-DRX) mode, and determining the next-scheduled active time for the baseband component comprises identifying a next-scheduled OnDuration time of the C-DRX mode for the baseband component.

6. The method of claim 1, wherein the DRX mode is an idle discontinuous reception (I-DRX) mode, and determining the next-scheduled active time for the baseband component comprises identifying a next-scheduled random access channel (RACH) event time of the I-DRX mode for the baseband component.

7. The method of claim 1, wherein the data request is tagged as a high-priority data request when the wireless communication device is connected to a power source, and the method further comprises:
causing the scheduling request to be issued immediately, when the tagged data request is tagged as a high-priority data request.

8. The method of claim 1, wherein the frequency at which the application is used is once a day and the tagged data request is tagged as a high-priority data request.

9. The method of claim 1, wherein the frequency at which the application is used is once a month and the tagged data request is tagged as a low-priority data request.

10. A wireless communication device, including:
a processor;
a baseband component configured to operate in a discontinuous reception (DRX) mode; and
a memory, wherein the memory stores instructions that, when executed by the processor, cause the wireless communication device to implement a method for managing application-generated data requests, the method comprising steps of:
receiving a data request from an application,
tagging the data request as a low-priority data request or a high-priority data request based on a frequency at which the application is used, wherein the data request is tagged as a high-priority data request when the application is executing as a foreground application and also when the application is executing as a background application that is frequently accessed by a user of the wireless communication device,
forwarding the tagged data request to the baseband component,
determining whether the tagged data request is tagged as a low-priority data request,
determining a next-scheduled active time for the baseband component based on parameters associated with the DRX mode,
causing a scheduling request to be issued immediately, when the tagged data request is tagged as a high-priority data request, and
causing the scheduling request to be issued for the next-scheduled active time, when the tagged data request is tagged as a low-priority request.

11. The wireless communication device of claim 10, wherein the DRX mode is a continuous discontinuous reception (C-DRX) mode, and determining the next-scheduled active time for the baseband component comprises identifying a next-scheduled OnDuration time of the C-DRX mode for the baseband component.

12. The wireless communication device of claim 10, wherein the DRX mode is an idle discontinuous reception (I-DRX) mode, and determining the next-scheduled active time for the baseband component comprises identifying a next-scheduled random access channel (RACH) event time of the I-DRX mode for the baseband component.

13. The wireless communication device of claim 10, wherein execution of the instructions by the processor further causes the wireless communication device to cause the scheduling request to be issued immediately when the tagged data request is tagged as a high-priority data request.

14. The wireless communication device of claim 10, wherein the data request is tagged as a high-priority data request when the wireless communication device is connected to a power source, and wherein execution of the instructions by the processor further causes the wireless communication device to:
cause the scheduling request to be issued immediately, when the tagged data request is tagged as a high-priority data request.

15. The wireless communication device of claim 10, wherein the scheduling request is sent before the next-scheduled active time and a corresponding access grant is received during the next-scheduled active time.

16. A non-transitory computer-readable medium storing instructions that, when executed by a processor of a wireless communication device that includes a baseband component configured to operate in a discontinuous (DRX) mode, cause the wireless communication device to implement a method for managing application-generated data requests, the method comprising the steps of:
receiving a data request from an application;
tagging the data request as a low-priority data request or a high-priority data request based on a frequency at which the application is used, wherein the data request is tagged as a high-priority data request when the application is executing as a foreground application and also when the application is executing as a background application that is frequently accessed by a user of the wireless communication device;
forwarding the tagged data request to the baseband component;
determining whether the tagged data request is tagged as a low-priority data request;
determining a next-scheduled active time for the baseband component based on parameters associated with the DRX mode;
causing a scheduling request to be issued immediately, when the tagged data request is tagged as a high-priority data request; and
causing the scheduling request to be issued for the next-scheduled active time, when the tagged data request is tagged as a low-priority request.

17. The non-transitory computer-readable medium of claim 16, wherein the DRX mode is a continuous discontinuous reception (C-DRX) mode, and determining the next-scheduled active time for the baseband component comprises identifying a next-scheduled OnDuration time of the C-DRX mode for the baseband component.

18. The non-transitory computer-readable medium of claim 16, wherein the DRX mode is an idle discontinuous reception (I-DRX) mode, and determining the next-scheduled active time for the baseband component comprises identifying a next-scheduled random access channel (RACH) event time of the I-DRX mode for the baseband component.

* * * * *